(12) United States Patent
Richardson et al.

(10) Patent No.: US 10,644,743 B2
(45) Date of Patent: May 5, 2020

(54) APPARATUS AND METHODS FOR OBTAINING A CORRELATION FUNCTION IN THE FREQUENCY DOMAIN

(71) Applicant: Airbus Defence and Space Limited, Stevenage, Hertfordshire (GB)

(72) Inventors: Andrew Richardson, Stevenage (GB); Michael Turner, Stevenage (GB); David De-Castro Galan, Stevenage (GB); Michael Batiste, Stevenage (GB)

(73) Assignee: Airbus Defence and Space Limited, Stevenage (GB)

( * ) Notice: Subject to any disclaimer, the term of this patent is extended or adjusted under 35 U.S.C. 154(b) by 0 days.

(21) Appl. No.: 16/331,491

(22) PCT Filed: Sep. 8, 2017

(86) PCT No.: PCT/EP2017/072649
§ 371 (c)(1),
(2) Date: Mar. 7, 2019

(87) PCT Pub. No.: WO2018/046694
PCT Pub. Date: Mar. 15, 2018

(65) Prior Publication Data
US 2019/0199394 A1 Jun. 27, 2019

(30) Foreign Application Priority Data
Sep. 8, 2016 (EP) ..................... 16275130

(51) Int. Cl.
*H04B 1/709* (2011.01)
*G01S 19/30* (2010.01)
*H04B 1/7075* (2011.01)

(52) U.S. Cl.
CPC .............. *H04B 1/709* (2013.01); *G01S 19/30* (2013.01); *H04B 1/7075* (2013.01)

(58) Field of Classification Search
CPC ........ H04B 1/69; H04B 1/709; H04B 1/7075; G01S 19/30
See application file for complete search history.

(56) References Cited

U.S. PATENT DOCUMENTS 6,154,443 A * 11/2000 Huang ................. H04B 1/7093
370/210
6,975,690 B1 * 12/2005 Lin ......................... G01S 19/30
342/357.69

(Continued)

*Primary Examiner* — Siu M Lee (57) ABSTRACT

Apparatus and methods are disclosed for obtaining a correlation function between a Direct Sequence Spread Spectrum (DSSS) signal and a spreading code. A plurality of code replica samples are stored in memory at a relatively low sampling rate compared to the sampling rate at which the input DSSS signal is sampled. A correlation operator is obtained by reproducing the stored code replica samples, in order to obtain a correlation operator with the same number of samples as the block of DSSS signal samples currently being processed. For example, when the sampling rate of the DSSS signal is equal to an integer N multiple of the sampling rate used for the code replica samples, the stored replica samples are reproduced N times to obtain the correlation operator. The correlation operator is then multiplied by the block of DSSS signal samples and integrated to obtain a correlation function.

17 Claims, 3 Drawing Sheets

(56) References Cited

U.S. PATENT DOCUMENTS 9,465,115 B2\* 10/2016 Wishart .................. G01S 19/14
2016/0116599 A1\* 4/2016 Turner .................... G01S 19/30
342/357.68

\* cited by examiner

APPARATUS AND METHODS FOR OBTAINING A CORRELATION FUNCTION IN THE FREQUENCY DOMAIN

CROSS REFERENCE TO RELATED APPLICATIONS

The present application is a U.S. national phase application under 35 U.S.C. § 371 of International Application No. PCT/EP2017/072649, filed on Sep. 8, 2017 and published as WO 2018/046694 A1 on Mar. 15, 2018, which claims priority to EP Application No. 16275130.9, filed on Sep. 8, 2016. The content of each of these related applications is incorporated herein by reference in its entirety.

TECHNICAL FIELD

The present invention relates to calculating a correlation function in the frequency domain. More particularly, the present invention relates to obtaining a correlation function between a Direct Sequence Spread Spectrum (DSSS) signal and a replica of a spreading code.

BACKGROUND

Figure 1:
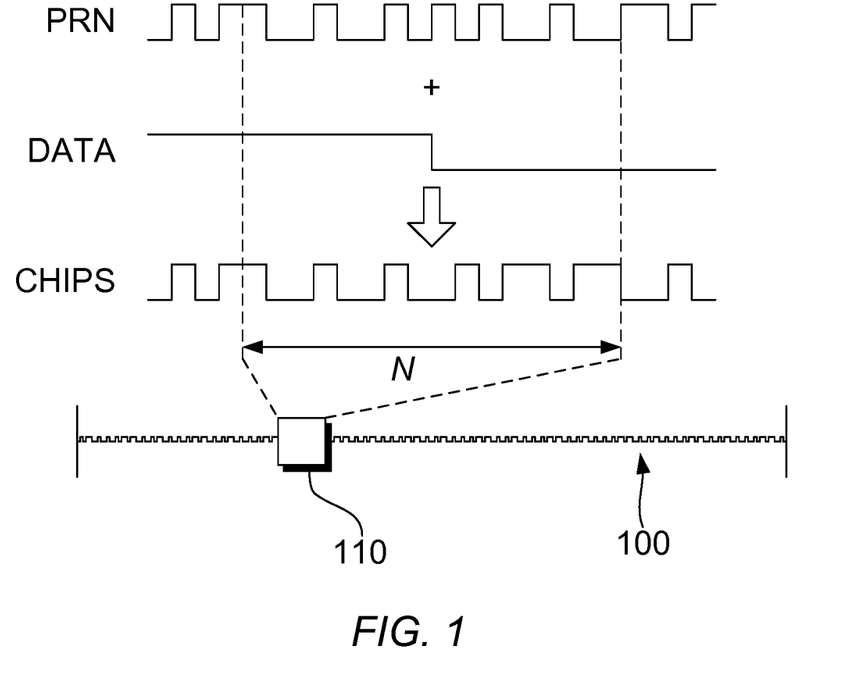
FIG. 1 illustrates an example of a Global Navigation Satellite System (GNSS) signal.

DSSS modulation is used in a wide variety of applications, including Global Navigation Satellite Systems (GNSS), radio frequency ranging systems, radio frequency time transfer systems, anti-jamming receivers and channel sounding. An example of a DSSS signal is illustrated in FIG. 1, and comprises a carrier wave that has been phase-modulated with a sequence of pseudonoise "chips", each chip having a much shorter duration than an information bit. The sequence of chips can be referred to as a spreading code, and comprises a Pseudo-Random Number (PRN) sequence. A data signal, which has a much lower bit rate than the chip signal, can be recovered from a received DSSS signal by multiplying the received DSSS signal with a replica of the spreading code.

Many Digital Signal Processing (DSP) algorithms require a DSSS signal to be correlated with a replica of a spreading code at the receiver. In a GNSS receiver, the correlation process can be considered to be the most important DSP process, since without this it would not be possible for the receiver to lock onto and track the downlink signals and make time-of-arrival measurements from satellites in a GNSS constellation. In general, a DSSS correlation process involves correlating incoming samples against a replica of a candidate spreading code, which can be referred to as a filter kernel, and detecting a peak in the correlation function. To make a precise time-of-arrival estimate, many GNSS implementations use a sample rate of the signal which is significantly larger than the native sample rate of the filter kernel, which in a GNSS receiver is one sample per chip.

A Fourier-based tracking algorithm for obtaining a correlation function in a GNSS receiver is disclosed in "A Real-time FFT Based Block Processing Method with Near Linear Scaling", M. Turner, A. R. (2015), ION ITM. The algorithm transforms blocks of 50% zero padded time domain samples into blocks of frequency domain samples, applies the Doppler and phase corrections that were obtained during acquisition, multiplies the frequency-domain samples by the relevant Fourier transformed spreading code, and accumulates data over one data symbol period to integrate the underlying correlation function over many Fast Fourier Transform (FFT) blocks. An Inverse FFT (IFFT) operation is then performed to transform the correlation function back to the time domain for further processing.

One drawback with this method is that the instantaneous memory bandwidth and capacity required can very quickly become unacceptably large. For example, when oversampling the Galileo Open service PRN signal, which has 4092 chips per PRN cycle, at an oversampling rate of 50×, the Fourier domain storage requirement per satellite tracking chain is: 4092×50(upsample)×13(bit)×2(zero pad)×2(complex)=10639200(bits)=10.6 Mbits. The memory bandwidth per tracking chain is: 50(oversample rate)×1023000(chip rate)×2(zero pad)×13(bit width)×2(complex)=2659800000 (bits/sec)=2.66 (Gbit/sec). Therefore to track downlink signals from one hundred satellites in a GNSS constellation, a total bandwidth of 266 Gb/s and 1 Gb of storage capacity would be required for a high performance receiver with a sample rate 50 MS/s. Currently, the most memory-rich commercially available Field Programmable Gate Array (FPGA) contains 24.2 Mbits of block random access memory (BRAM), and could therefore only accommodate up to two tracking channels in the above-described example. This limitation renders the Fourier-based tracking algorithm impractical for FPGA implementations, without using off-FPGA chip fast volatile memory.

The invention is made in this context.

SUMMARY OF THE INVENTION

According to a first aspect of the present invention, there is provided apparatus for calculating a correlation function between a Direct Sequence Spread Spectrum DSSS signal and a spreading code, the apparatus comprising: memory arranged to store a plurality of code replica samples, the code replica samples comprising samples of a complex conjugate of a time-to-frequency domain transformed replica of the spreading code obtained at a first sampling rate; a time-to-frequency domain transformation unit configured to receive a block of samples of the DSSS signal at a second sampling rate higher than the first sampling rate, and transform the samples from the time domain to the frequency domain to obtain a plurality of frequency-domain signal samples; a multiplication unit configured to obtain a correlation operator by reproducing the stored replica samples, and multiply the frequency-domain signal samples by the reproduced stored replica samples to obtain a plurality of multiplied samples; and an integrating unit configured to receive the multiplied samples and perform integration over a plurality of blocks of samples of the DSSS signal to calculate the correlation function.

In some embodiments according to the first aspect, the second sampling rate is equal to the first sampling rate multiplied by an integer N, and the multiplication unit is configured to obtain the correlation operator by reproducing the stored replica samples N times.

In some embodiments according to the first aspect, the second sampling rate is equal to the first sampling rate multiplied by a non-integer multiplier X, and the multiplication unit is configured to obtain the correlation operator by reproducing the stored replica samples an integer number N times, and to apply a frequency-domain interpolation or decimation to the frequency-domain signal samples such that a sampling rate of the interpolated or decimated signal samples matches a sampling rate of the correlation operator, before multiplying the frequency-domain signal samples by the reproduced stored replica samples.

In some embodiments according to the first aspect, the apparatus further comprises a moving average filter unit configured to multiply the correlation function by a moving average filter correlation matrix.

In some embodiments according to the first aspect, the apparatus further comprises a modulation unit configured to multiply the correlation function by a modulation matrix to account for a modulation scheme used in the DSSS signal.

In some embodiments according to the first aspect, the apparatus further comprises a plurality of signal processing branches each configured to calculate a correlation function between the block of samples of the DSSS signal and a different spreading code, wherein the moving average filter unit and/or the modulation unit are shared between the plurality of signal processing branches such that the moving average filter unit and/or the modulation unit is configured to receive a plurality of correlation functions from the plurality of signal processing branches.

In some embodiments according to the first aspect, the integrating unit is configured to perform the integration across a transition between consecutive data symbol periods in the DSSS signal, and to determine a polarity of a data symbol in each of the data symbol periods based on a polarity of the obtained correlation function.

In some embodiments according to the first aspect, the apparatus further comprises a frequency-to-time domain transformation unit configured to transform the obtained correlation function from the frequency domain into the time domain.

In some embodiments according to the first aspect, the apparatus is embodied in a Field Programmable Gate Array chip.

According to a second aspect of the present invention, there is provided a method of calculating a correlation function between a Direct Sequence Spread Spectrum DSSS signal and a spreading code using a plurality of code replica samples, the code replica samples comprising samples of a complex conjugate of a time-to-frequency domain transformed replica of the spreading code obtained at a first sampling rate, the method comprising: receiving a block of samples of the DSSS signal at a second sampling rate higher than the first sampling rate; transforming the samples from the time domain to the frequency domain to obtain a plurality of frequency-domain signal samples; obtaining a correlation operator by reproducing the stored replica samples; multiplying the frequency-domain signal samples by the reproduced stored replica samples to obtain a plurality of multiplied samples; and integrating the multiplied samples over a plurality of blocks of samples of the DSSS signal to calculate the correlation function.

In some embodiments according to the second aspect, the second sampling rate is equal to the first sampling rate multiplied by an integer N, and the correlation operator is obtained by reproducing the stored replica samples N times.

In some embodiments according to the second aspect, the second sampling rate is equal to the first sampling rate multiplied by a non-integer multiplier X, and the correlation operator is obtained by reproducing the stored replica samples an integer number N times, and applying a frequency-domain interpolation or decimation to the frequency-domain signal samples such that a sampling rate of the interpolated or decimated signal samples matches a sampling rate of the correlation operator, before multiplying the frequency-domain signal samples by the reproduced stored replica samples.

In some embodiments according to the second aspect, the method further comprises multiplying the correlation function by a moving average filter correlation matrix.

In some embodiments according to the second aspect, the method further comprises multiplying the correlation function by a modulation matrix to account for a modulation scheme used in the DSSS signal.

In some embodiments according to the second aspect, the method further comprises calculating a correlation function between the block of samples of the DSSS signal and a different spreading code using a plurality of signal processing branches, wherein the moving average filter correlation matrix and/or the modulation matrix are applied by a shared unit configured to receive the plurality of correlation functions from the plurality of signal processing branches.

In some embodiments according to the second aspect, the integration is performed across a transition between consecutive data symbol periods in the DSSS signal, and the method further comprises determining a polarity of a data symbol in each of the data symbol periods based on a polarity of the obtained correlation function.

In some embodiments according to the second aspect, the method further comprises a step of transforming the obtained correlation function from the frequency domain into the time domain.

According to a third aspect of the present invention, there is provided a computer-readable storage medium arranged to store computer program instructions which when executed perform a method according to the second aspect.

BRIEF DESCRIPTION OF THE DRAWINGS

Embodiments of the present invention will now be described, by way of example only, with reference to the accompanying drawings, in which.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the scope of the present invention. In particular, embodiments of the invention are described below in relation to tracking GNSS signals, but it will be understood that the principles disclosed herein can also be applied to other types of DSSS signal. Accordingly, the drawings and description are to be regarded as illustrative in nature and not restrictive. Like reference numerals designate like elements throughout the specification.

Figure 2:
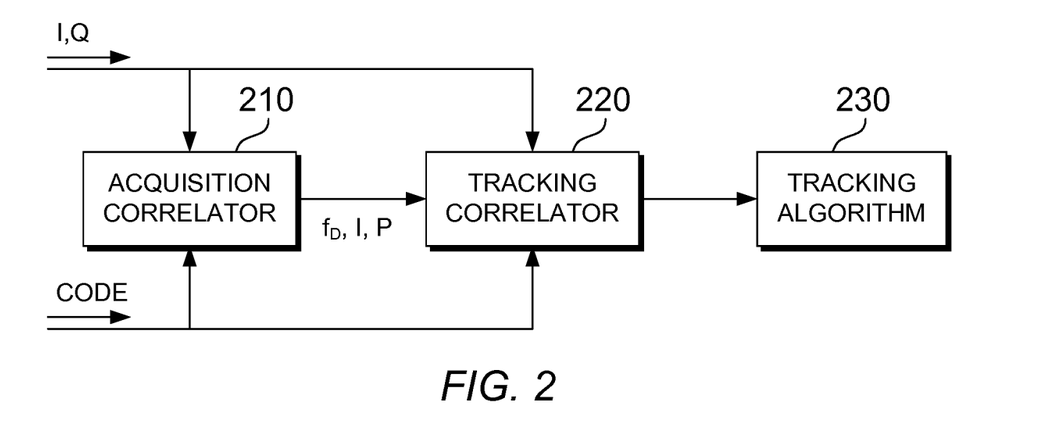
FIG. 2 illustrates apparatus for demodulating a DSSS signal, according to an embodiment of the present invention.

Referring now to FIG. 2, apparatus for demodulating a DSSS signal is illustrated according to an embodiment of the present invention. The apparatus comprises a DSSS acquisition correlator 210, a DSSS tracking correlator 220, and a DSSS tracking algorithm 230. Although in the present embodiment separate acquisition and tracking correlators 210, 220 are shown, in other embodiments a single correlator may perform correlation for both acquisition and tracking processes. The acquisition correlator 210 obtains coarse Doppler and phase corrections and passes these to the tracking correlator 220.

The acquisition correlator 210 and the tracking correlator 220 both receive I and Q samples of a received DSSS signal. For example, a receiver which includes the apparatus of FIG. 2 can further comprise an antenna arranged to receive a DSSS signal, an amplifier arranged to amplify the received DSSS signal, a down-converting module arranged to down-convert the amplified DSSS signal to an IF signal, and an analogue-to-digital converter (ADC) arranged to sample the IF signal and output digitised samples of the DSSS signal. The I and Q samples can be obtained from the ADC output samples by multiplying with local oscillator sine and cosine waveforms.

Also, as shown in FIG. 2 the acquisition correlator 210 and the tracking correlator 220 both receive samples of a replica spreading code which are stored in memory. The acquisition correlator 210 and the tracking correlator 220 are both configured to obtain a correlation function between the received I/Q signal samples and the samples of the replica spreading code. Depending on the embodiment, one or both of the acquisition correlator 210 and the tracking correlator 220 can use a frequency-domain correlation method to obtain the correlation function. An example of apparatus for obtaining a correlation function between a DSSS signal and a replica of a spreading code in the frequency domain is illustrated in FIG. 3, according to an embodiment of the present invention.

Figure 3:
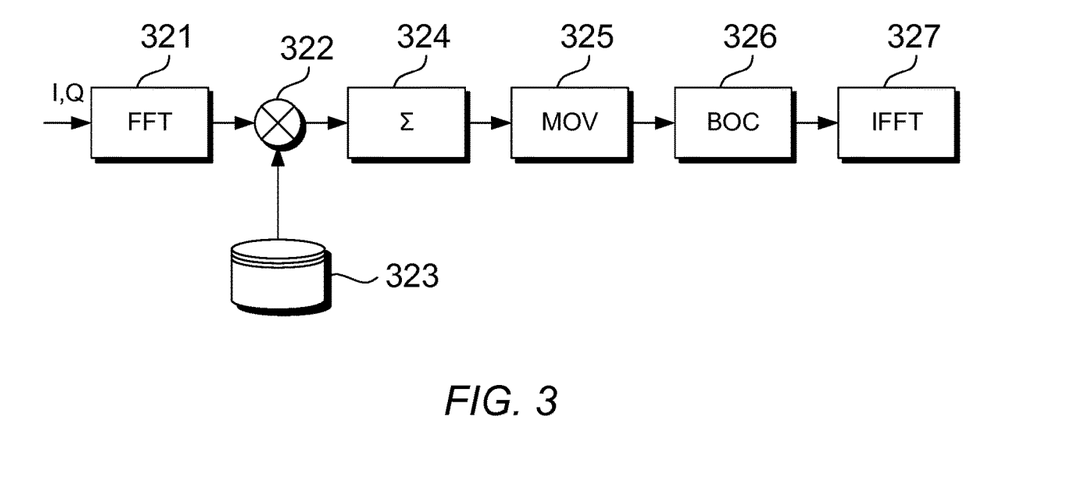
FIG. 3 illustrates apparatus for calculating a correlation function between a DSSS signal and a replica of a spreading code, according to an embodiment of the present invention.

As shown in FIG. 3, the apparatus of the present embodiment comprises a time-to-frequency domain transformation unit 321 which is configured to receive a block of samples of a DSSS signal and transform the samples from the time domain to the frequency domain to obtain a plurality of frequency-domain signal samples. In the present embodiment the frequency domain transformation unit 321 is configured to apply a FFT transformation, but in other embodiments a different type of time-to-frequency transformation may be used.

The apparatus further comprises a multiplication unit 322 which is configured to multiple the frequency-domain signal samples by a correlation operator, to obtain a plurality of multiplied samples. The multiplication unit 322 is configured to generate the correlation operator from replica samples stored in memory 323. A method of obtaining the correlation operator is described in more detail below. The apparatus further comprises an integrating unit 324 configured to receive the multiplied samples and perform integration over a plurality of blocks of samples of the DSSS signal, in order to obtain the correlation function.

In the present embodiment, the apparatus further comprises a moving average filter 325 configured to receive the correlation function from the integrating unit 324 and apply a moving average filter function, and a Binary Offset Carrier (BOC) unit 326 configured to apply BOC modulation after the moving average filter has been applied. As will become apparent from the following description, in some embodiments the moving average filter function and/or BOC modulation may be applied at different stages in the processing chain, for example when generating the correlation operator before multiplication takes place, or after multiplication but before integrating. Furthermore, in some embodiments the BOC unit 326 may be omitted if BOC modulation is not used in the received DSSS signal, or another type of modulation may be applied as required.

Finally, in the present embodiment the apparatus comprises an IFFT unit 327 configured to transform the samples from the frequency domain back to the time domain for further processing in the receiver. In some embodiments, the IFFT unit 327 may be omitted and further processing can be performed in the frequency domain. For example, an integral from one data symbol to the next can be calculated in the frequency domain to determine the polarity of the data symbols, without having to perform a frequency-to-time domain transformation.

In the present embodiment the memory 323 is arranged to store the plurality of code replica samples having a first sampling rate. In the present embodiment, the sampling rate at which the code replica samples are stored is equal to the native "baseband" sample rate of the spreading code. The code replica samples comprise samples of a complex conjugate of a time-to-frequency domain transformed replica of the spreading code, at the first sampling rate. The FFT unit 321 receives the I,Q signal samples of the DSSS signal at a second sampling rate which is higher than the first sampling rate, and in the present embodiment is equal to an integer N multiple of the first sampling rate. In order to generate a correlation operator with the same number of samples as the block of DSSS signal samples that is currently being processed, the multiplication unit 322 is configured to reproduce the stored replica samples N times. A method of obtaining the correlation operator from the stored replica samples will now be described.

The basic definition of time domain complex correlation over a time duration t, using linear algebra notation, is:

$$C_t \cdot s_t = f_t \tag{1}$$

where $C_t$ is a correlation operator matrix derived from the replica spreading code over the time duration t, s is the signal vector sampled over the same duration, and $f$ is the correlation function output. In general, the correlation operator replica must be sampled at the same rate as the signal and can be defined for cyclic or zero-padded correlation. Hence in the present embodiment, the stored replica code samples are reproduced N times to generate a correlation operator with the correct sample rate. The reason that the stored replica code samples can simply be replicated N times, as opposed to storing the replica code samples at the same sampling rate at which the DSSS signal samples are received, will become apparent from the following explanation.

The correlation matrix $C_t$ is a circulant matrix filled with the replica at single sample shifts over each row, or over each column. The replica may also contain additional modulation such as BOC, in which case the additional modulation will be represented in the correlation operator matrix $C_t$. The symmetry of this correlation matrix is shown below:

$$C_t = \begin{bmatrix} c_1 & c_2 & c_3 & \ldots & c_N \\ c_2 & c_3 & \vdots & \ldots & c_1 \\ c_3 & \vdots & c_N & \ldots & c_2 \\ \vdots & c_N & c_1 & \ldots & c_3 \\ c_N & c_1 & c_2 & \ldots & \vdots \end{bmatrix} \tag{2}$$

As explained above, the sample rate of the replica should be increased to match that of the DSSS signal being processed. To understand the process by which the Fourier domain correlation operator is obtained in embodiments of the present invention, it can be helpful to consider the time domain correlation matrix, which can be defined using a specific series of linear operators from which the corresponding Fourier domain equation can be derived.

First the replica of duration t is sampled at a lower rate than the sampling rate that will be used for the DSSS signal samples. In the present embodiment, the replica of duration t is sampled at its native sample rate, equal to the bit rate of the replica code.

In some embodiments the replica may include any additional modulation such as BOC(1,1) modulation, but in the embodiment of FIG. 3 any additional modulation is applied after integrating in the frequency domain.

For a PRN which takes values of 0 or 1, the baseband sample rate corresponds to one sample per chip. For continuous filter kernels, this sample rate is arbitrary. In any case, the sampling rate at which the replica code samples are stored should be selected so as to be sufficient to encompass the bandwidth of the filter kernel. In the present embodiment, the sampling rate selected for the replica code samples is an integer multiple of the native rate of the spreading code. The code replica sampled at the native rate is denoted by $c_t$ (also referred to as the "baseband" filter kernel), and the Fourier version of this vector which has been interpolated to the DSSS signal sample rate is denoted by $c_t^f$. The ratio between the DSSS signal sample rate and the native filter sample rate is defined as l.

The correlation operator matrix $C_t$, which contains N rows and columns, can be derived from the Fourier interpolated baseband replica using linear operators, by 1) puncturing the Fourier interpolated base band replica to produce the zero-stuffed up-sampled base band filter kernel, 2) applying BOC modulation to the resulting zero stuffed replica, 3) applying a moving average filter to produce a zero order sample-and-hold replica, used as the correlation filter kernel, and 4) applying a left and right multiplied permutation matrix. This process enables the circulant correlation operator matrix $C_t$ to be synthesized from the filter, which can be written in matrix form as:

$$C_t = \sum_i^N P_i MBZR_t P_i \tag{3}$$

where $P_i$ is the i-th cyclic permutation matrix of order N, $$M = \sum_{i=0}^N lP_i \tag{4}$$

where M is the moving average filter correlation matrix, $$B = I - P_M l \tag{5}$$

where B is a BOC(1,1) modulation matrix, $$Z = \delta_{ij} \times \sum_m^{N/l} \delta(i - l \times m) \tag{6}$$

where $\delta_{ij}$ is the konica delta and $\delta(x-d)$ is the Dirac delta function, Z is a sample-zeroing matrix to transform the Fourier interpolated replica to the zero-padded baseband filter kernel, $$R_t = \begin{bmatrix} \uparrow & 0 & 0 \\ c_t & 0 & 0 \\ \downarrow & 0 & 0 \end{bmatrix} \tag{7}$$

and $R_t$ is a matrix with the replica $c_t^f$ in the first column and zero everywhere else.

The $MBZC_t$ term in equation (3) prepares the replica in column 1 of $R_t$ such that it is transformed into the sample-and-hold up-sampled base band replica $c_t$, at the required signal sample rate and with BOC(1,1) modulation applied. The cyclic permutation matrices $P_i$ applied to the left and right and the final summation ensure that a correlation matrix is constructed by progressively shifting the vector into an adjacent column, barrel shifting the rows. Under the Fourier similarity transform, equation (3) can be rewritten as:

$$F^* C_t F = \sum_i^N F^* P_i MBZC_t P_i F \tag{8}$$

Furthermore, since the discrete Fourier transformation matrix is unitary, to within a scaling constant, then:

$$FF^* = I \tag{9}$$

and equation (8) can be expanded to:

$$F^* C_t F = \tag{10}$$
$$\sum_i^N ((F^* P_i F) \times (F^* MF) \times (F^* BF) \times (F^* ZF) \times (F^* C_t F) \times (F^* P_i F))$$

It can be noted that the grouped terms are similarity transforms of the enclosed operators from the discrete time basis set to the Fourier basis set. Re-writing the operators to indicate a new basis set representation of each, equation (10) can be simplified as follows:

$$C_t^f = \sum_i^N P_i^f M^f B^f Z^f C_t^f P_i^f \tag{11}$$

In the Fourier domain, $C_t^f$, $P_t^f$, $M^f$ and $B^f$ are all diagonal since they are all circulant matrices in the time domain. This allows refactoring of equation (11) as follows:

$$C_t^f = M^f B^f \sum_i^N P_i^f Z^f C_t^f P_i^f \tag{12}$$

Furthermore, since $M^f$, $B^f$ and $C_t^f$ are all diagonal, then:

$$\sum_{i}^{N} P_i^f Z^f C_t^f P_i^f \quad (13)$$

must also be diagonal. The summation term in (13) is a frequency domain correlation matrix which is constructed in the time domain from the base band filter kernel, $c_t$, and zero-stuffed up-sampled to the DSSS signal sample rate. In the Fourier domain this operator is the Fourier transformation of the zero-stuffed replica $c_t$ across the diagonal of the matrix.

As described above, in the present embodiment the multiplication unit 322 is configured to reproduce the stored replica samples N times in order to generate a correlation operator with the same number of samples as the block of DSSS signal samples that is currently being processed. This is based on the realisation that the Fourier transform of a zero-stuffed up-sampled vector can be constructed from the non-zero stuffed vector in the Fourier domain by simply replicating it multiple times to fill the whole vector. This occurs because the periodic zero-stuffing acts to subsample the Fourier basis set, which in turn results in aliasing of the Fourier integrals and the repeating Fourier domain filter kernel. Hence in embodiments of the present invention, the full zero-order sample-and-hold correlation operator in the Fourier domain can be constructed by storing only the Fourier transformed baseband code replica samples at the baseband sample rate, reproducing the stored code replica samples N times, and applying diagonal operators to the synthesized replica.

Therefore if the ratio of the baseband sample rate and the signal sample rate is M, then there is a M fold reduction in storage requirement for the replica in the frequency domain, where M may take an integer value as in the example above or may take a non-integer value.

Figure 4:
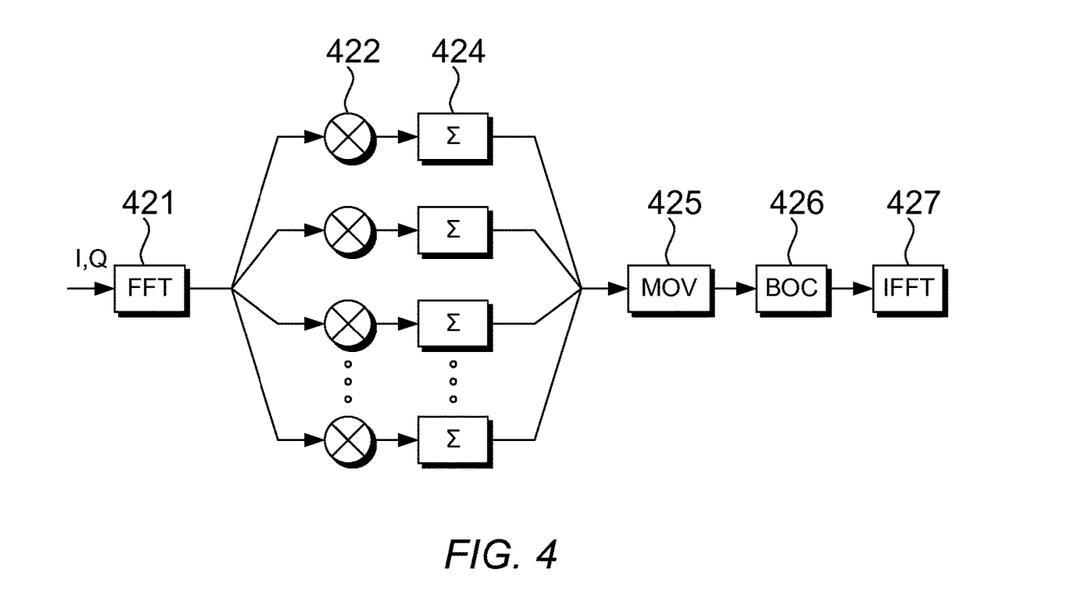
FIG. 4 illustrates apparatus for tracking a plurality of satellites at a GNSS receiver, according to an embodiment of the present invention.

Furthermore, in embodiments of the invention in which a plurality of spreading codes need to be tracked, such as a GNSS receiver, a similar property can be exploited to achieve further efficiency gains. FIG. 4 illustrates an apparatus for tracking a plurality of satellites at a GNSS receiver is illustrated, according to an embodiment of the present invention. As shown in FIG. 4, the apparatus comprises a plurality of processing chains each of which is arranged to correlate the Fourier transformed signal samples outputted by the FFT unit 421 with a different spreading code, in order to track a different satellite in the GNSS constellation. Each processing chain comprises a multiplication unit 422, memory (omitted in FIG. 4 for clarity), and integration unit 424. Also, in the present embodiment the processing chains are configured to share a moving average filter 425, BOC unit 426 and IFFT unit 427. This arrangement takes advantage of the fact that the moving average filter matrix $M^f$ and BOC matrix $B^f$ are independent of the specific code replicas used by individual processing chains, and therefore can be applied to the correlation functions outputted by all of the processing chains.

In the embodiments shown in FIGS. 3 and 4, the integration units 324, 424 can be configured to continue accumulating samples until a full symbol's worth of samples has been processed. The integrated correlation function outputted by the integration unit 324, 424 can then be transformed back into the time domain by the IFFT units 327, 427 to recover the time-domain correlation peak.

Figure 5:
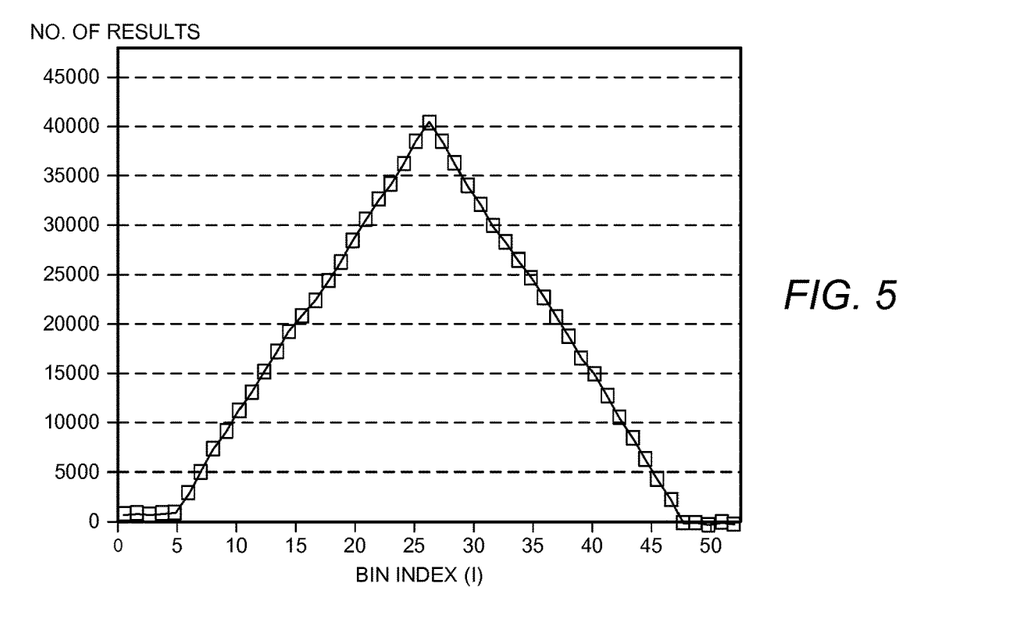
FIG. 5 illustrates an example of a correlation function output by the apparatus of FIG. 3, according to an embodiment of the present invention.

An example of a correlation peak is illustrated in FIG. 5, according to an embodiment of the present invention. In the present embodiment the received DSSS signal is a Global Position System (GPS) signal modulated by a Coarse/Acquisition (CA) spreading code. The CA spreading code comprises a PRN sequence which repeats every millisecond, and there are 1023 chips per PRN sequence. In the present embodiment the signal and spreading code are sampled at a rate of 20.46 million samples (Msamples) per second. There are therefore 20 samples per chip, and 20460 samples in each FFT and inverse FFT. The correlation function will also have 20460 samples, reflecting all the phases of the spreading code compared to the signal.

The magnitude of the PRN autocorrelation function of the GPS CA code is approximately 30 decibels (dB). FIG. 5 illustrates the correlation function obtained for the above-described parameters. As shown in FIG. 5, the correlation function includes a correlation peak. The index of the correlation bin in which the correlation peak occurs indicates the code phase of the received signal. Also, in the present embodiment, since there are 20 samples per chip there will be 20 early and late correlation bins around the correlation peak, corresponding to code phase differences of up to plus and minus one chip between the DSSS signal and the replica spreading code. At larger code phase differences than ±1 chip, the correlation results will close to zero.

Figure 6:
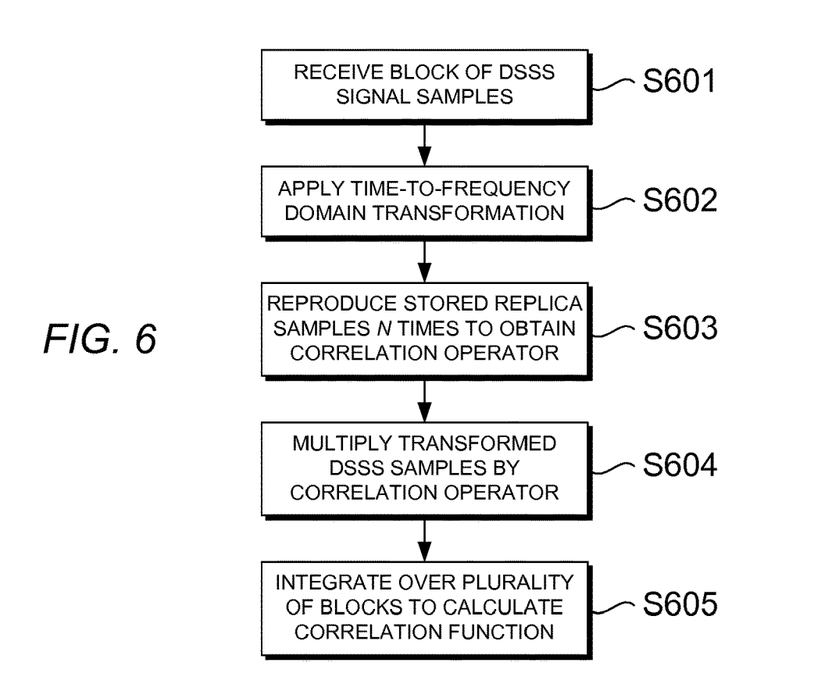
FIG. 6 is a flowchart showing a method of calculating a correlation function between a DSSS signal and a replica of a spreading code, according to an embodiment of the present invention.

Referring now to FIG. 6, a flowchart is illustrated showing a method of obtaining a correlation function between a DSSS signal and a replica of a spreading code, according to an embodiment of the present invention. The method shown in FIG. 6 corresponds to the sequence of operations performed by the processing blocks in the apparatus shown in FIG. 3, up to and including the integration unit 324. In some embodiments the method may further comprise additional steps corresponding to the operations performed by any of the moving average filter 325, BOC unit 326, and IFFT unit 327 of FIG. 3. Furthermore, in some embodiments a method similar to the one shown in FIG. 6 may be performed by each of a plurality of processing branches as shown in the embodiment of FIG. 4, to obtain a plurality of correlation functions between the DSSS signal and different spreading codes.

As shown in FIG. 6, the method begins at step S601 by receiving a block of samples of the DSSS signal at a higher sampling rate than the sampling rate at which the replica samples are stored in memory. Then, in step S602 the received DSSS signal samples are transformed from the time domain to the frequency domain to obtain a plurality of frequency-domain signal samples. Next, in step S603 a correlation operator is obtained by reproducing the stored replica samples, and in step S604 the frequency-domain signal samples are multiplied by the obtained correlation operator to obtain a plurality of multiplied samples. Finally, in step S605 the multiplied samples are integrated over a plurality of blocks of samples of the DSSS signal to calculate the correlation function.

As explained above with reference to FIGS. 3 and 4, a method such as the one shown in FIG. 6 provides a significant reduction in the memory capacity that is required to store the replica code samples, since the code samples can be stored at a much lower sampling rate than the rate at which the received DSSS signal is sampled.

Embodiments of the present invention have been described which can achieve a significant reduction in the number of code replica samples which must be stored, when using a Fourier-based correlation algorithm. Specifically, the number of code replica samples that must be stored is reduced by a factor equal to the replica up-sample rate. This is made possible by exploiting the fact that the Fourier transform of the baseband replica has an approximately constant envelope, and can therefore be homogeneously quantized across all samples in the frequency domain. Hence, fewer bits are needed to store the baseband replica.

Furthermore, this decreased bit width has additional advantages as well as a reduction in the storage capacity required to store the code replica samples. The numerical operations implemented within the multiplication units 322, 422 can be implemented with fewer silicon gates, and the resulting accumulation registers used to store the frequency domain correlation function can also be made smaller. When implemented in a FPGA, signal routing is also simplified by the corresponding decrease in the accumulation bit width. For example, an embodiment such as the one shown in FIG. 4 would be capable of tracking approximately 350 satellites when implemented in a FPGA with 24.2 Mbits of dedicated BRAM.

In the above-described embodiments of the invention, the native sampling rate of the DSSS signal is an integer multiple of the sampling rate at which the code replica samples are stored. Accordingly, the stored replica samples are up-sampled to match the native sampling rate of the DSSS signal by reproducing the stored replica samples an integer number of times. This results in a correlation operator which has the same number of samples as the block of DSSS signal samples currently being processed, allowing a frequency-domain multiplication to be performed. However, in other embodiments the native sampling rate of the DSSS signal may be a non-integer multiple of the sampling rate of the code replica samples.

In such non-integer up-sampling embodiments, the multiplication unit can be configured to obtain the correlation operator by reproducing the stored replica samples an integer number of times, and the DSSS signal is sampled at some other rate close to the integer rate at which the stored replica samples are reproduced. These samples of the DSSS signal are Fourier transformed in an identical manner to that described above. Then, if the signal sample rate is slower than the integer up-sample rate applied to the stored replica samples, zeros are padded in the centre of the DSSS signal's Fourier transform, effectively performing a Fourier interpolation. Alternatively, if the signal sample rate is faster than the integer up-sample rate applied to the stored replica samples, then excess samples are deleted from the centre of the DSSS signal's Fourier transform, effectively performing a Fourier decimation. This process ensures that the replica and signal are sample rate matched. That is, the sampling rate of the interpolated or decimated DSSS signal samples matches a sampling rate of the correlation operator, allowing the interpolated or decimated frequency-domain DSSS signal samples to be multiplied by the correlation operator. This method allows a sufficiently close approximation to the integer up-sample method to provide an acceptable level of accuracy.

Whilst certain embodiments of the invention have been described herein with reference to the drawings, it will be understood that many variations and modifications will be possible without departing from the scope of the invention as defined in the accompanying claims.

The invention claimed is:

1. Apparatus for calculating a correlation function between a Direct Sequence Spread Spectrum DSSS signal and a spreading code, the apparatus comprising:

memory arranged to store a plurality of code replica samples, the code replica samples comprising samples of a complex conjugate of a time-to-frequency domain transformed replica of the spreading code obtained at a first sampling rate;

a time-to-frequency domain transformation unit configured to receive a block of samples of the DSSS signal at a second sampling rate higher than the first sampling rate, and transform the samples from the time domain to the frequency domain to obtain a plurality of frequency-domain signal samples;

a multiplication unit configured to obtain a correlation operator by reproducing the stored replica samples, and multiply the frequency-domain signal samples by the reproduced stored replica samples to obtain a plurality of multiplied samples; and an integrating unit configured to receive the multiplied samples and perform integration over a plurality of blocks of samples of the DSSS signal to calculate the correlation function.

2. The apparatus of claim 1, wherein the second sampling rate is equal to the first sampling rate multiplied by an integer N, and the multiplication unit is configured to obtain the correlation operator by reproducing the stored replica samples N times.

3. The apparatus of claim 1, wherein the second sampling rate is equal to the first sampling rate multiplied by a non-integer multiplier X, and wherein the multiplication unit is configured to obtain the correlation operator by reproducing the stored replica samples an integer number N times, and to apply a frequency-domain interpolation or decimation to the frequency-domain signal samples such that a sampling rate of the interpolated or decimated signal samples matches a sampling rate of the correlation operator, before multiplying the frequency-domain signal samples by the reproduced stored replica samples.

4. The apparatus of claim 1, further comprising:

a moving average filter unit configured to multiply the correlation function by a moving average filter correlation matrix.

5. The apparatus of claim 1, further comprising:

a modulation unit configured to multiply the correlation function by a modulation matrix to account for a modulation scheme used in the DSSS signal.

6. The apparatus of claim 4, further comprising:

a plurality of signal processing branches each configured to calculate a correlation function between the block of samples of the DSSS signal and a different spreading code, wherein the moving average filter unit and/or a modulation unit are shared between the plurality of signal processing branches such that the moving average filter unit and/or the modulation unit is configured to receive a plurality of correlation functions from the plurality of signal processing branches.

7. The apparatus of claim 1, wherein the integrating unit is configured to perform the integration across a transition between consecutive data symbol periods in the DSSS signal, and to determine a polarity of a data symbol in each of the data symbol periods based on a polarity of the obtained correlation function.

8. The apparatus of claim 1, further comprising:

a frequency-to-time domain transformation unit configured to transform the obtained correlation function from the frequency domain into the time domain.

9. The apparatus of claim 1, wherein the apparatus is embodied in a Field Programmable Gate Array chip.

10. A method of calculating a correlation function between a Direct Sequence Spread Spectrum DSSS signal and a spreading code using a plurality of code replica samples, the code replica samples comprising samples of a complex conjugate of a time-to-frequency domain transformed replica of the spreading code obtained at a first sampling rate, the method comprising:
- receiving a block of samples of the DSSS signal at a second sampling rate higher than the first sampling rate;
- transforming the samples from the time domain to the frequency domain to obtain a plurality of frequency-domain signal samples;
- obtaining a correlation operator by reproducing the code replica samples;
- multiplying the frequency-domain signal samples by the reproduced code replica samples to obtain a plurality of multiplied samples; and
- integrating the multiplied samples over a plurality of blocks of samples of the DSSS signal to calculate the correlation function.

11. The method of claim 10, wherein the second sampling rate is equal to the first sampling rate multiplied by an integer N, and the correlation operator is obtained by reproducing the code replica samples N times.

12. The method of claim 10, wherein the second sampling rate is equal to the first sampling rate multiplied by a non-integer multiplier X, and
- wherein the correlation operator is obtained by reproducing the code replica samples an integer number N times, and applying a frequency-domain interpolation or decimation to the frequency-domain signal samples such that a sampling rate of the interpolated or decimated signal samples matches a sampling rate of the correlation operator, before multiplying the frequency-domain signal samples by the reproduced stored replica samples.

13. The method of claim 10, further comprising:
multiplying the correlation function by a moving average filter correlation matrix.

14. The method of claim 10, further comprising:
multiplying the correlation function by a modulation matrix to account for a modulation scheme used in the DSSS signal.

15. The method of claim 13, further comprising:
- calculating a correlation function between the block of samples of the DSSS signal and a different spreading code using a plurality of signal processing branches,
- wherein the moving average filter correlation matrix and/or the modulation matrix are applied by a shared unit configured to receive the plurality of correlation functions from the plurality of signal processing branches.

16. The method of claim 10, wherein the integration is performed across a transition between consecutive data symbol periods in the DSSS signal, and the method further comprises:
- determining a polarity of a data symbol in each of the data symbol periods based on a polarity of the obtained correlation function.

17. A non-transitory computer-readable storage medium arranged to store computer program instructions which when executed perform a method according to claim 10.

* * * * *